May 9, 1933.    L. M. EVANS ET AL    1,908,014
FILM CUTTING AND FEED CONTROL MECHANISM
Filed Aug. 2, 1930    3 Sheets-Sheet 1
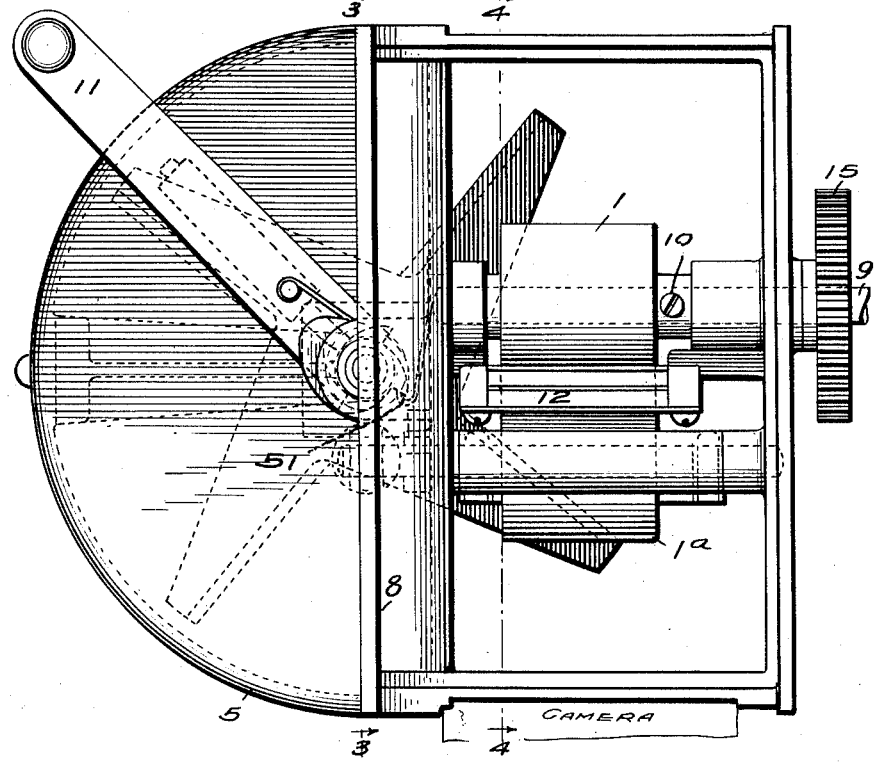
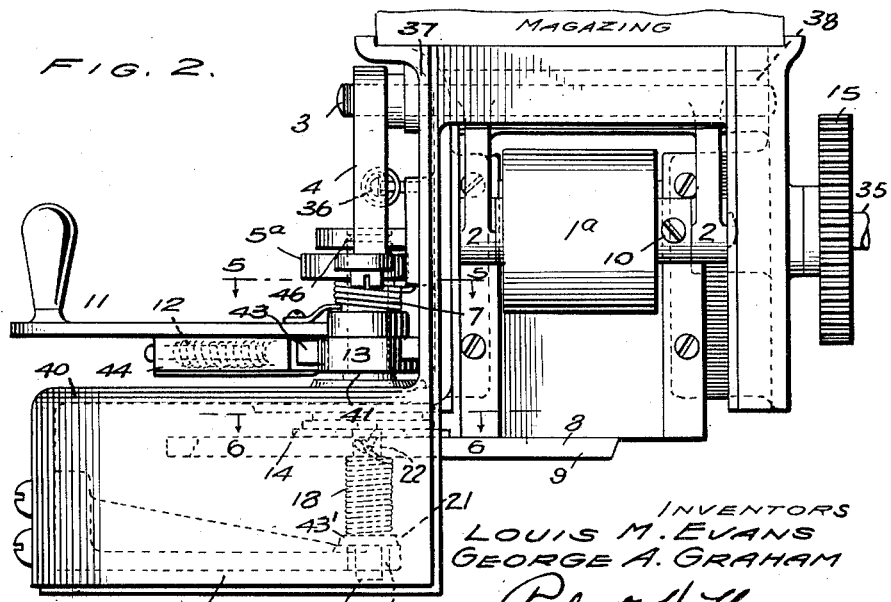
INVENTORS
LOUIS M. EVANS
GEORGE A. GRAHAM
BY Robert H. Young
ATTORNEY INVENTORS
LOUIS M. EVANS
GEORGE A. GRAHAM
BY Robert H. Young
ATTORNEY May 9, 1933.   L. M. EVANS ET AL   1,908,014
FILM CUTTING AND FEED CONTROL MECHANISM
Filed Aug. 2, 1930   3 Sheets-Sheet 3
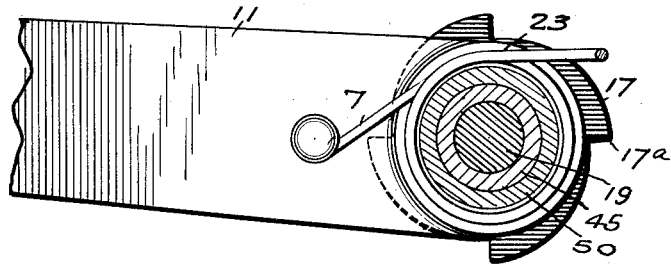
FIG. 5.
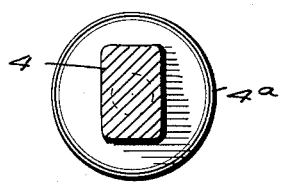
FIG. 6.   FIG. 7.
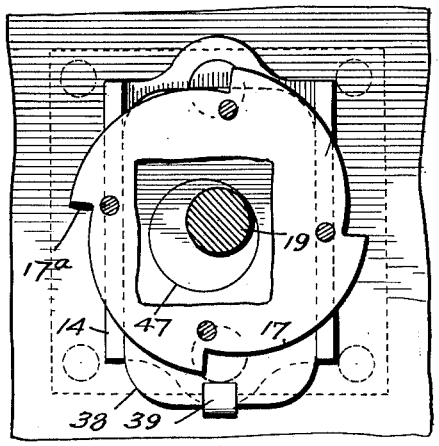
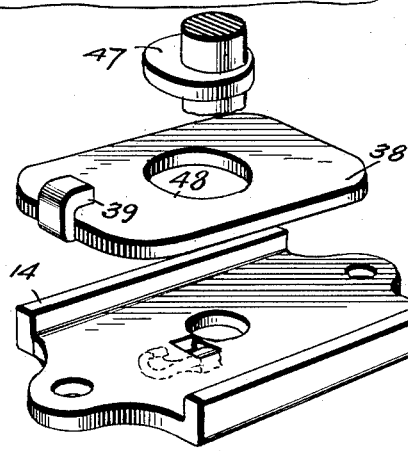
FIG. 8.
INVENTORS
LOUIS M. EVANS
GEORGE A. GRAHAM
BY Robert H. Young
ATTORNEY Patented May 9, 1933

1,908,014

UNITED STATES PATENT OFFICE

LOUIS M. EVANS, OF ALEXANDRIA, VIRGINIA, AND GEORGE A. GRAHAM, OF FORT MONMOUTH, NEW JERSEY; CITIZENS NATIONAL BANK AND MARY E. EVANS, EXECUTORS OF SAID LOUIS M. EVANS, DECEASED

FILM CUTTING AND FEED CONTROL MECHANISM

Application filed August 2, 1930. Serial No. 472,608.

(GRANTED UNDER THE ACT OF MARCH 3, 1883, AS AMENDED APRIL 30, 1928; 370 O. G. 757)

The invention described herein may be manufactured and used by or for the Government for governmental purposes, without the payment to us of any royalty thereon.

This invention relates to a film cutting and feed control mechanism and provide instrumentalities for shearing or cutting paper, film or similar material, whether at rest or during feeding movement at low or high speeds. The applications of such a device are numerous, among which are the moving film or sensitized paper type of camera, oscillograph recorders, or any other apparatus where it is desired to cut paper, film or the like in a positive way which eliminates the possibility of jamming.

One of the main objects of this invention is to provide a new and improved means of cutting the sensitized paper or film in those cameras or recorders which expose, develop, and fix, a continuous record of events over intervals of time.

Another main object of this invention is to provide in a camera, photographic recorder, or any device which processes such material, a means by which the cut off length of paper, film, or other material is continued through the process while the supply is stopped, but is held in position to be started through again at will.

Another main object of this invention is to provide a new and improved means for cutting paper, film or similar material in any of those devices in which it is desired to pass paper or film through certain processes or functions, and to cut at will or in predetermined lengths automatically or manually in a clean, sure manner.

Other objects will appear as the description proceeds.

A preferred embodiment of the invention is illustrated in the accompanying drawings, which show the knife mechanism and mode of operation, together with a suggestive showing of so much of a camera or recorder as is deemed necessary for clarity of disclosure.

In the drawings:

Fig. 1 is a top plan view of a film cutting and feed control mechanism embodying the invention;

Fig. 2 is a side elevation of the same;

Fig. 5 is a horizontal section taken on the line 5—5 of Fig. 2, and including a section of the swinging arm hereinafter described;

Fig. 6 is a section taken on line 6—6 of Fig. 2 showing the trigger trip ratchet, trigger slide and associated parts, the trigger being shown in locked position with respect to one of the ratchet teeth;

Fig. 7 is a view similar to Fig. 6 showing the trigger at the moment of being unlocked upon 90° rotation of shaft and eccentric; and Fig. 8 is an exploded view showing in detail perspective the trigger slide and trigger, the track or guideway and eccentric washer keyed to the shaft.

Figure 3:
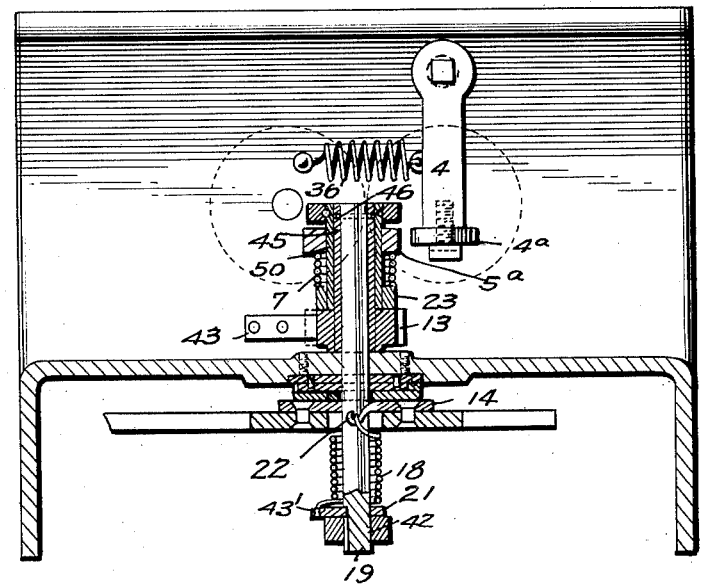
Fig. 3 is a view partly in section taken on the line 3—3 of Fig. 1.

Such a camera or recorder consists of a system of rollers usually covered with rubber or other surfacing material which in conjunction with proper "putting on" and "picking off" devices convey sensitized paper or film from a magazine across the field of a condensing lens, thence through a built in developer tray, and into a fixing tray, after which the record is guided into a rinsing bath.

Referring to Fig. 1, 12 is the paper slot in which the end of the film or sensitized paper is inserted, it being understood that the paper or film is carried on a roll in a light tight, magazine which mounts between surfaces 8 of housing 5. The numeral 1 designates a rubber surfaced roller locked with set screw 10 to shaft 9 which is driven by gear 15 through a gear train, properly housed, by an electrical motor or other prime mover at any speed desired.

As shown in Fig. 2, a similar rubber surfaced roller 1a is carried on a shaft 35, which has bearing in a rocker fork 2. The rocker fork is set on shaft 3 and pivots with it about bearings 37 and 38. Arm 4 is fixed to shaft 3 by a squared surface, and arm 4 is held to the rear under tension of spring 36, (see Fig. 3). It will, therefore, be seen that roller 1a is held into frictional engagement with roller 1 under the tension of spring 36 acting through arm 4, shaft 3 and rocker fork 2. Also roller 1a may be disengaged from the drive of roller 1 by cam 5a to be described hereinafter.

Figure 4:
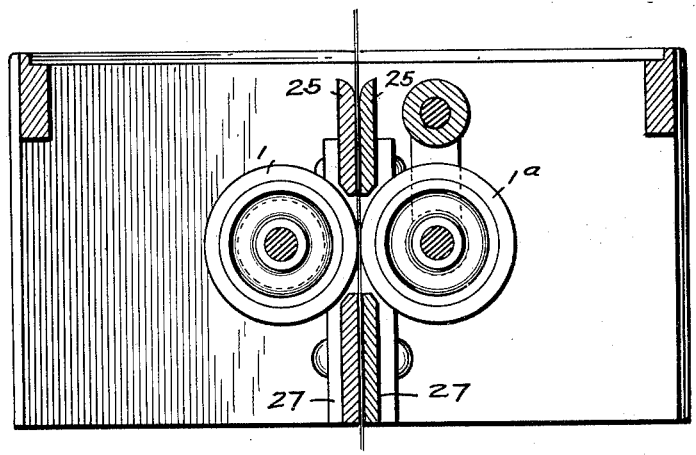
Fig. 4 is a sectional view taken on the line 4—4 of Fig. 1, showing the film guides and feed rollers, with associated parts, hereinafter described.

Upon the end of a roll of sensitized paper or film being inserted in slot 12, rollers 1 and 1a in engaged position grip the paper and draw it down through slot 12. The paper is guided between the slot edges to guide 25, and down into another guide 27, (see Fig. 4). It is understood that sufficient space is allowed to provide for the swinging movement of roller 1a; and it is further understood that additional guide rollers, or equivalents, may be provided, also a supply roller or reel, all of which constitute means to carry the film or paper through the developing solution, fixing bath and rinsing bath, not shown. The lens is not shown but may be mounted in any suitable manner with relation to the film or paper to the end that proper exposure may be made within the field of the lens.

The knife 9 has four blades formed preferably from one piece of sheet metal, such as stainless steel, or any suitable material, with edges ground and positioned with respect to the paper, film, or other sensitized material as shown in Fig. 1, and in operative relation to the shear edge 8 as shown in Fig. 2. Referring to Figs. 2 and 3, the knife is riveted near its center to a U shaped track or guideway 14, (shown in more detail in Figs. 6 and 7) and bearing on shaft 19. Within the track 14 there is allowed to work a slide or plate 38 which has integral with it a trigger 39, held normally at rest by trigger trip ratchet 17, (see Figs. 6, 7 and 8). The trigger trip ratchet 17 is provided with four teeth or stop positions 17a, correctly timed with respect to the position in which it is desired to stop the knife. The trigger trip ratchet is screwed or riveted to the housing 40. Shaft 19 has bearings at 42 of arm 20 and at 41 of housing. A heavy spring 18 is assembled under tension about the shaft so that it is fixed to the shaft by a loop at 43' in a slot of washer 21 which is keyed to the shaft. At its other extremity the spring is attached to the knife at hook 22 through the riveted U shaped track 14.

It will therefore be seen that we have a knife under considerable spring tension held in position by trigger 39, engaged with one of the four ratchet teeth 17a (see Figs. 6 and 7). It remains to be shown how this trigger is tripped and the normal spring tension held constant. This is done by rotating shaft 19, through 90° in the proper direction, during which rotation the spring tension is correspondingly increased and the trigger is tripped at the 90° position. This releases the knife which moves to the next ratchet tooth with considerable force under tension of spring 18.

Referring to Figs. 6, 7, and 8, the shaft 19 is keyed to an eccentric washer 47 positioned for operation in hole 48 of the trigger slide 38. A rotation of shaft 19 in a counter clockwise direction acts to move the trigger slide 38 in trigger unlocking direction within the U shaped track or guideway 14. This movement of the trigger slide 38 is gauged by cam washer 47 and is sufficient to move trigger 39 out of engagement with ratchet tooth 17a, upon a 90° rotation of shaft 19, (see Figs. 6 and 7). Therefore, given proper spring tension track 14, trigger slide 38 and knife blade 9 move sharply around through an arc of 90° to the next ratchet tooth stop (see Figs. 6 and 7). In brief, a 90° movement of the shaft builds up spring tension and releases the knife which follows the 90° shaft movement with a chopping action.

The method used to turn the shaft is shown in Figs. 2 and 3. A lever 11, with pawl 43 under spring 12 in barrel 44, is pivoted at 23 on the hollow sleeve bushing ratchet 13 and so arranged that the lever by its pawl engaged in one of the four ratchet teeth of the ratchet may upon the lever being moved through 90° move the ratchet also. A spring 7 is arranged to return the lever 11 sharply to normal in which position the pawl 43 drops into the next ratchet tooth of 13. Shaft 19 is pinned at 46 to a bushing 45 carried internally of sleeve 50. Bushing 45, therefore, provides an upper bearing surface for shaft 19 on the bushing of lever 11. After a movement through 90° the ratchet 13 is prevented from following the lever in return by a pawl spring shown best in dotted lines at 51, Figure 1. The lever 11 is shown in normal or rest position in Figure 1 and seats in a shock absorbing device, not shown, to take up the impact of its return under action of spring 7, Figure 2.

Besides tensioning the knife spring and tripping the knife trigger, the lever in its movement from normal to advance position first disengages the paper feed roller 1, Figure 3, thereby preparing to stop the paper feeding from the magazine the instant the knife blade chops through it. This action is provided as shown in Figure 2 by a cam 5a set to the lever bushing which actuates the roller 4a of arm 4 and by thrusting arm 4 forward disengages roller 1a from frictional contact with roller 1, Figure 1. This action was previously described. The cam 5a is shown in Figs. 2 and 3.

Now whereas the method shown has in consideration that the lever be moved manually, other means may be employed and automatic means is also contemplated.

The advantages of this method of cutting are many, the most pronounced being the cutting action at high speed, and the fact that the cutting blade after passing through the paper is out of the way, and does not obstruct or interfere with subsequent action.

We claim:

1. In a film cutting and feed control mechanism, the combination with means for feeding the film; of film cutting means; means to actuate the cutting means; means to release the cutting means periodically; control means for aperiodically initiating the action of said release means; and means actuated by said control means and independently thereof to interrupt the action of said feeding means incidental to the film cutting operation.

2. In a film cutting and feed control mechanism, the combination with film cutting means; of tensioning means to actuate said cutting means; means comprising a trigger mechanism to release the cutting means periodically; a control lever operable aperiodically and at variable speeds to actuate the release means and functioning to store up energy in said tensioning means whereby the cutting means operates under maximum tension when released, and independently of the return movement of said control lever.

3. In a film cutting and feed control mechanism, the combination with film cutting means; of tensioning means to actuate the cutting means; an aperiodic control lever and means operable therewith to store up energy in said tensioning means; means responsive to the action of said control lever to release the cutting means automatically under predeterminable maximum impulse of said tensioning means, said cutting means being actuated at a uniform rate of acceleration by said tensioning means independently of the speed of said control lever.

4. In a film cutting and feed control mechanism; film feeding means including a pair of feed rollers, normally held in film-feeding position, one of said rollers being mounted for movement out of feeding position relative to the other; adjusting means for moving the latter roller out of feeding position; driving means for said rollers; film cutting means; means for actuating said cutting means; control means to initiate the operation of said cutting means; and means actuated by the said control means and cooperating with said adjusting means to move said roller out of feeding position and simultaneously with the film cutting operation.

5. In a film cutting and feed control mechanism; film feeding means comprising a pair of feed rollers, normally held in film-feeding position, one of said rollers being adjustably mounted relative to the other resilient means for retaining the latter roller in feeding position; and adjusting means to move said roller out of feeding position; driving means for said rollers; film cutting means; means for actuating said cutting means; control means to initiate the operation of said cutting means; and independent means actuated by the said control means and cooperating with said adjusting means to move said adjustable roller out of feeding position and simultaneously with the film cutting operation.

6. In a film cutting and feed control mechanism, and including a housing for said mechanism; the combination of a film cutter rotatably mounted and provided with a plurality of shearing blades; a frame structure and a knife bar mounted therein for operation with said blades; spring means to actuate said cutter; means to release the cutter periodically; a control lever to operate said release means; film feeding means mounted for operation in said frame and adapted to feed the film in the cutting path of said shearing blades; and means actuated by said control lever and adjustable independently thereof to interrupt the action of said feeding means during the film cutting operation.

7. In a film cutting and feed control mechanism, and including a housing for said mechanism; the combination with means for progressively feeding the film, of a film cutting knife; spring means to actuate said knife; a control lever to initiate the operation of said knife; a plate rigidly secured to the knife and having a guideway formed therein; a trigger plate having sliding movement in said guideway, said plate being formed with a central perforation and having a trigger integral therewith; a disc mounted to work eccentrically in said perforation and operable by said control lever to transmit sliding movement to said trigger plate; a trigger trip ratchet rigidly secured to the housing, said ratchet having a series of teeth adapted to engage successively with said trigger to permit step by step movement of said knife responsive to each operative movement of said control lever.

In testimony whereof we affix our signatures.

LOUIS M. EVANS.
GEORGE A. GRAHAM.